K. J. SEVERSON.
POTATO DIGGER.
APPLICATION FILED AUG. 24, 1914.
1,143,446.
Patented June 15, 1915.
3 SHEETS—SHEET 1.
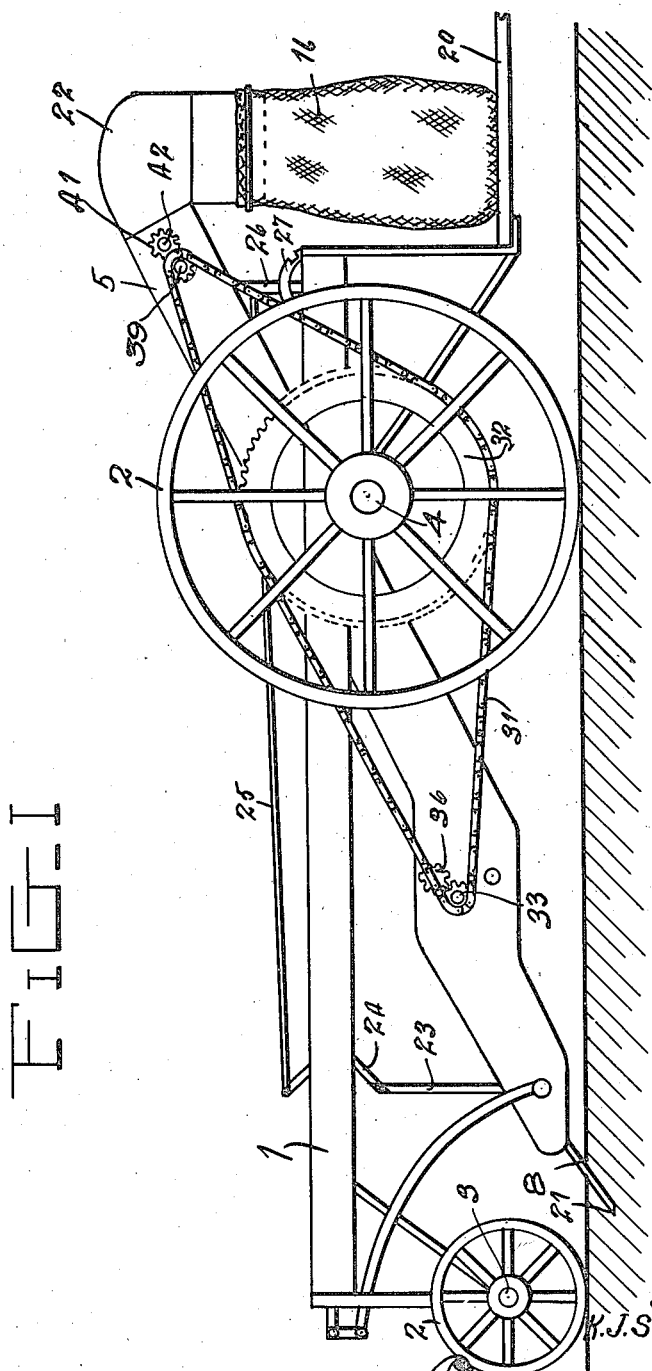
FIG. 1
Witnesses
Chas H. Trotter
Robt Meyer
Inventor
K. J. Severson
By 
Attorney

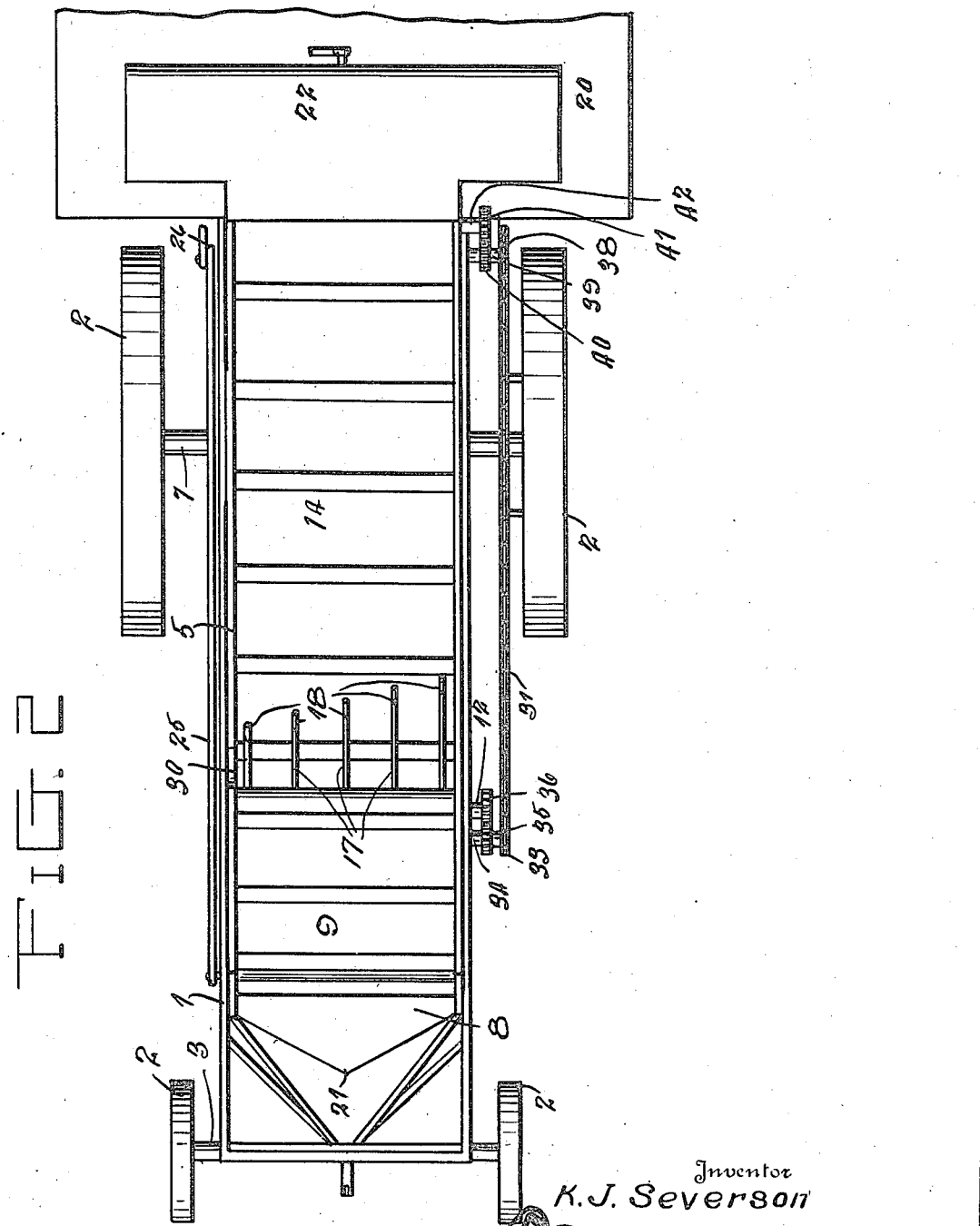

K. J. SEVERSON.
POTATO DIGGER.
APPLICATION FILED AUG. 24, 1914.
1,143,446.
Patented June 15, 1915.
3 SHEETS—SHEET 3.
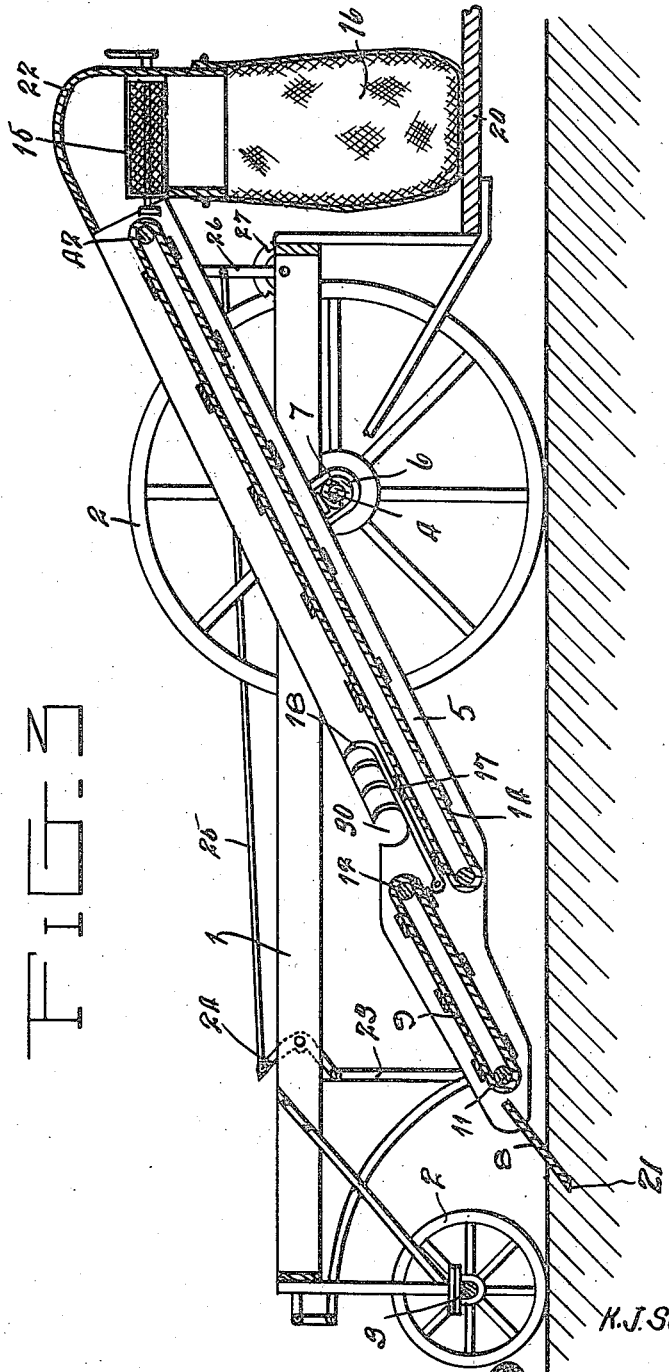
Witnesses
Chas. H. Trotter
Robt Meyer
Inventor
K. J. Severson
By 
Attorney

UNITED STATES PATENT OFFICE.

KNUTE J. SEVERSON, OF BARNESVILLE, MINNESOTA.

POTATO-DIGGER.

1,143,446.   Specification of Letters Patent.   Patented June 15, 1915.

Application filed August 24, 1914. Serial No. 858,275.

*To all whom it may concern:*

Be it known that I, KNUTE J. SEVERSON, a citizen of the United States, residing at Barnesville, in the county of Clay and State of Minnesota, have invented certain new and useful Improvements in Potato-Diggers; and I do hereby declare the following to be a full, clear, and exact description of the invention, such as will enable others skilled in the art to which it appertains to make and use the same.

This invention relates to diggers and more particularly to a device for digging or harvesting potatoes, and the primary object of the invention is the provision of a potato digger which embodies a shearer or digging knife which is carried by the forward end of the structure of the potato digger and which carries the potatoes to conveyers, from whence they are elevated to a desired height for depositing in sacks or similar receptacles.

Another object of this invention is the provision of an oscillatory weeding or cleaning element associated with the conveying structure of the potato digger which separates from the potatoes, weeds, grass, or the stems of the potatoes, thereby causing the machine to deposit the potatoes perfectly clean within the sack or other receptacle.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which, Figure 1 is a side elevation of the improved potato digger, Fig. 2 is a top plan view, and Fig. 3 is a central sectional view through the improved digger.

Referring more particularly to the drawings, 1 designates the supporting structure of the potato digger, which structure is supported by a suitable and ordinary set of traction wheels 2, which traction wheels are mounted upon axles 3 and 4. The rear axle 4 has a conveyer carrying frame 5 supported thereby as is clearly shown in Fig. 3 of the drawings. The conveyer carrying frame 5 has U-shaped brackets 6 secured to the under surface thereof, which brackets encompass the sleeve 7 which are mounted upon the outer surface of the rear axle 4.

The conveyer supporting structure 5 has a shearer blade or digging blade 8 mounted in the lower terminal end thereof, which blade is adapted for insertion into the ground for uprooting the potato plants. A conveyer 9 is mounted for travel within the lower portion of the frame 5 and it passes about rollers 11 and 12. The conveyer 9 is positioned for receiving the potatoes and the potato plants from the blade 8 and carrying them upwardly and depositing them upon the conveyer 14. The conveyer 14 is of considerably greater length than the conveyer 9 and it elevates the potatoes from the lower portion of the frame 5 to the uppermost portion thereof and deposits them upon a transversely extending conveyer 15. The transversely extending conveyer 15 is supported at the rear end of the potato digger and it carries the potatoes transversely of the line of travel of the machine and deposits them in any suitable type of receptacle 16, such as an ordinary potato-retaining sack. The potatoes, upon passing from the conveyer 9 to the conveyer 14, are engaged by oscillatory or pivotally mounted weeding fingers 17. The weeding fingers 17 are positioned within the conveyer parallel with the line of travel thereof and they have their uppermost ends curved upwardly as is shown at 18, so as to separate the plants from the potatoes or for the separation of weeds, grass, and the like from the potatoes so that only the potatoes themselves will be carried upwardly over the conveyer 14. A platform 20 is supported at the rear end of the machine and it supports the bags or retainers 16 as well as providing the place where the person driving or operating the potato digger, may stand.

The shearer or digging blade 8 has its forward end formed in two surfaces which extend obliquely to the line of travel of the potato digger and terminate in a central point 21, so as to facilitate the insertion of the blade into the ground as well as the proficient digging of the potatoes.

The various fingers 17 are of different lengths, so that the curved ends thereof will be disposed in a line obliquely to the line of travel of the potato digger, by means of which obliquely positioning weeds or plants will be engaged at different intervals for properly separating them from the potatoes.

The fingers will also break up any large particles of dirt which might be elevated by the various conveyers. A housing or hood 22 is mounted over the conveyer 15 and has communication with the upper end of the casing 5, so as to prevent losing of any of the potatoes.

The lower end of the casing 5 has a link 23 connected thereto, which link extends vertically from the lower end of the casing 5 and is connected to one arm of a bell crank lever 24. The bell crank lever 24 is pivotally mounted upon the frame 1 and it has a rod 25 connected thereto. The rod 25 extends rearwardly along the frame 1 and is secured to a hand lever 26, which lever coacts with a quadrant 27 for regulating the elevation of the forward end of the casing 5 as well as the insertion of the blade into the ground. The casing 5 is provided with an opening 30 for permitting of the passage of potato plants, weeds or the like out of the casing.

The conveyer 9 is driven by a sprocket chain 31, which sprocket chain passes about a sprocket wheel 32. The sprocket wheel 32 is mounted upon one of the rear traction wheels 2 of the potato digger and the sprocket chain 31 also passes about a sprocket 33 which is mounted upon a stub shaft 34 as is clearly shown in Fig. 2 of the drawings. The stub shaft 34 has a gear 35 mounted thereupon which meshes with the second gear 36. The gear 36 is mounted upon the outer end of the roller over which the conveyer 9 travels and thus the conveyer is operated by the traction of the potato digger. The sprocket chain 31 also passes about a sprocket 38 which is mounted upon the stub shaft 39. The stub shaft 39 is carried by the upper end of the frame or casing 5 and it has a gear 40 mounted thereupon which meshes with the gear 41. The gear 41 is mounted upon the outer terminal end of the roller 42, about which the conveyer 14 travels.

From the foregoing description taken in connection with the accompanying drawings, the advantages of the construction and of the method of operation of the improved potato digger will be readily apparent to those skilled in the art to which this invention appertains and while in the foregoing description, the principle of the operation of the invention has been described together with various features of construction, it is to be understood that certain minor features of construction, combination and arrangement of parts may be altered to suit practical conditions provided such alterations are comprehended within the scope of what is claimed.

What is claimed is:

1. In a potato digger, a digging knife, a conveyer for elevating the potatoes from the digging knife, and a plurality of weeding fingers having their upper ends curved upwardly for engaging the potatoes upon elevation by said conveyer and separating the plants and weeds from the potatoes.

2. In a potato digger, a digging knife, a conveyer for elevating the potatoes from the digging knife, and a plurality of weeding fingers having their upper ends curved upwardly for engaging the potatoes upon elevation by said conveyer and separating the plants and weeds from the potatoes, said weeding fingers being of different length and having their curved ends disposed in a line obliquely of the width of the conveyer.

3. In a potato digger, a digging knife, a conveyer for elevating the potatoes from the digging knife, and a plurality of weeding fingers having their upper ends curved upwardly for engaging the potatoes upon elevation by said conveyer and separating the plants and weeds from said potatoes, said weeding fingers being pivotally carried by said potato digger for independent oscillatory movement.

In testimony whereof I affix my signature in presence of two witnesses.

KNUTE J. SEVERSON.

Witnesses:
 ANTON DAHM.
 LYMAN WARREN.